United States Patent [19]

Voigt

[11] Patent Number: 5,105,679
[45] Date of Patent: Apr. 21, 1992

[54] CAMSHAFT ARRANGEMENT

[75] Inventor: Dieter Voigt, Wolfsburg, Fed. Rep. of Germany

[73] Assignee: Volkswagen AG, Wolfsburg, Fed. Rep. of Germany

[21] Appl. No.: 573,551

[22] Filed: Aug. 24, 1990

[30] Foreign Application Priority Data

Aug. 31, 1989 [DE] Fed. Rep. of Germany ....... 3928781

[51] Int. Cl.$^5$ .................. F16H 53/00; F01L 1/34
[52] U.S. Cl. .................. 74/567; 74/568 R; 123/90.17
[58] Field of Search .............. 74/567–569; 123/90.17, 90.6

[56] References Cited

U.S. PATENT DOCUMENTS

| | | | |
|---|---|---|---|
| 4,193,321 | 3/1980 | King | 74/567 |
| 4,688,313 | 8/1987 | Keller | 74/567 |
| 4,790,271 | 12/1988 | Onda | 123/90.17 X |
| 4,870,872 | 10/1989 | Parsons | 123/90.17 X |
| 4,886,022 | 12/1989 | Nakai | 123/90.17 |

FOREIGN PATENT DOCUMENTS

| | | | |
|---|---|---|---|
| 975192 | 9/1975 | Canada | 74/567 |
| 3234640 | 3/1984 | Fed. Rep. of Germany | 74/567 |
| 0133409 | 8/1983 | Japan | 123/90.17 |
| 62-77402 | 4/1987 | Japan | 74/567 |
| 1005007 | 3/1983 | U.S.S.R. | 74/567 |
| 1288413 | 2/1987 | U.S.S.R. | 74/568 R |
| 1115093 | 5/1968 | United Kingdom | 74/567 |

Primary Examiner—Vinh T. Luong
Attorney, Agent, or Firm—Brumbaugh, Graves, Donohue & Raymond

[57] ABSTRACT

The specification describes a camshaft arrangement which opens a load-change valve of an internal combustion engine includes a camshaft having a projection which extends beyond what is otherwise a circular cross-section. The camshaft projection limits the relative angular motion between the camshaft and the cam element and includes a buffer which may comprise elastic material or a piston which interacts with a hydraulic medium. The buffer acts to cushion the approach motion of the camshaft projection and the inner wall, or stop, of the cam element, to prevent undesirable noise produced by, or wear of, the camshaft arrangement.

15 Claims, 3 Drawing Sheets

CAMSHAFT ARRANGEMENT

BACKGROUND OF THE INVENTION

1. FIELD OF THE INVENTION

This invention relates to camshaft arrangements having a variable cam for opening preferably a load-change valve of an internal combustion engine and, more particularly, to a load-change valve camshaft arrangement providing for cushioned contact between the camshaft and the cam.

2. DESCRIPTION OF THE PRIOR ART

A camshaft arrangement having a variable cam is disclosed by German Offenlegungsschrift No. DE 32 34 640. The cam arrangement disclosed therein provides variable opening times for load-change valves of an internal combustion engine. In that arrangement, the camshaft has a portion projecting radially beyond the perimeter of the otherwise circular cross-section of the camshaft. The projecting portion is disposed within an internal recess of the cam element and is allowed restricted movement in the direction of rotation. Lateral bounding surfaces of the cam recess provide stops which restrict the angular motion of the radially projecting portion of the camshaft. The recess in the cam element communicates by way of a check valve with a supply passage in the camshaft for a hydraulic medium.

In the embodiment described in the German Offenlegungsschrift, the radially projecting portion of the camshaft has a throttling aperture so that the hydraulic medium will cushion relative motions between the cam element and the camshaft. The cross-section of the throttling aperture is independent of the rotational speed, hence the degree of cushioning varies with the rotation speed. This cushioning means is important, for example, when the posterior flank of the cam element is engaged by the valve stem after the point of maximum valve stroke has passed. At this time, the cam element is accelerated in the direction of the rotation of the camshaft by the restoring force of the valve. During this phase of operation, the cam element moves at a higher angular velocity than the camshaft, thus overtaking the latter. The impact resulting from this relative motion will generate unacceptable noise and cause damage without a cushioning means. In the prior art, this relative motion between the radial extension of the camshaft and the posterior stop in the cam element is cushioned by the aforementioned hydraulic medium, thereby avoiding such a hard impact.

However, because the cushioning means in the known arrangement employs a hydraulic medium within both the camshaft and the cam element, appropriate sealing measures are required. To avoid loss of hydraulic medium in the known arrangement, elaborate sealing precautions such as maintenance of close tolerances are necessary to provide for sealing of the recess in the cam element.

SUMMARY OF THE INVENTION

Accordingly, it is an object of the present invention to provide a camshaft arrangement which overcomes the above-mentioned disadvantages of the prior art.

Another object of the invention is to provide a camshaft arrangement which eliminates hard impact between at least one of the stops within the cam element and the surface of a radially extending portion of the camshaft, thus preventing any undue noise and wear without the necessity for elaborate sealing measures.

These and other objects of the invention are attained by providing a variable-valve cam arrangement with a cushioning buffer disposed between the cam element and the radially extending portion of the camshaft. Preferably, the cushioning buffer is made of an elastic material. Alternatively, the buffer may utilize a hydraulic medium, as in the prior art, but in this case the cushioning arrangement is wholly contained within the camshaft. In another embodiment, a buffer comprises both a piston that interacts with the hydraulic medium and a separate flow throttle. A further embodiment employs a buffer comprising a piston with a two-tiered stem portion to vary the degree of cushioning. In these latter embodiments, the hydraulic medium does not directly interface with the cam element, thus avoiding the need for any sealing means. All the disclosed embodiments reduce noise and wear since the buffer absorbs the impact between the elongated portion of the camshaft and the stop within the cam element which is caused by the valve-closing action.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
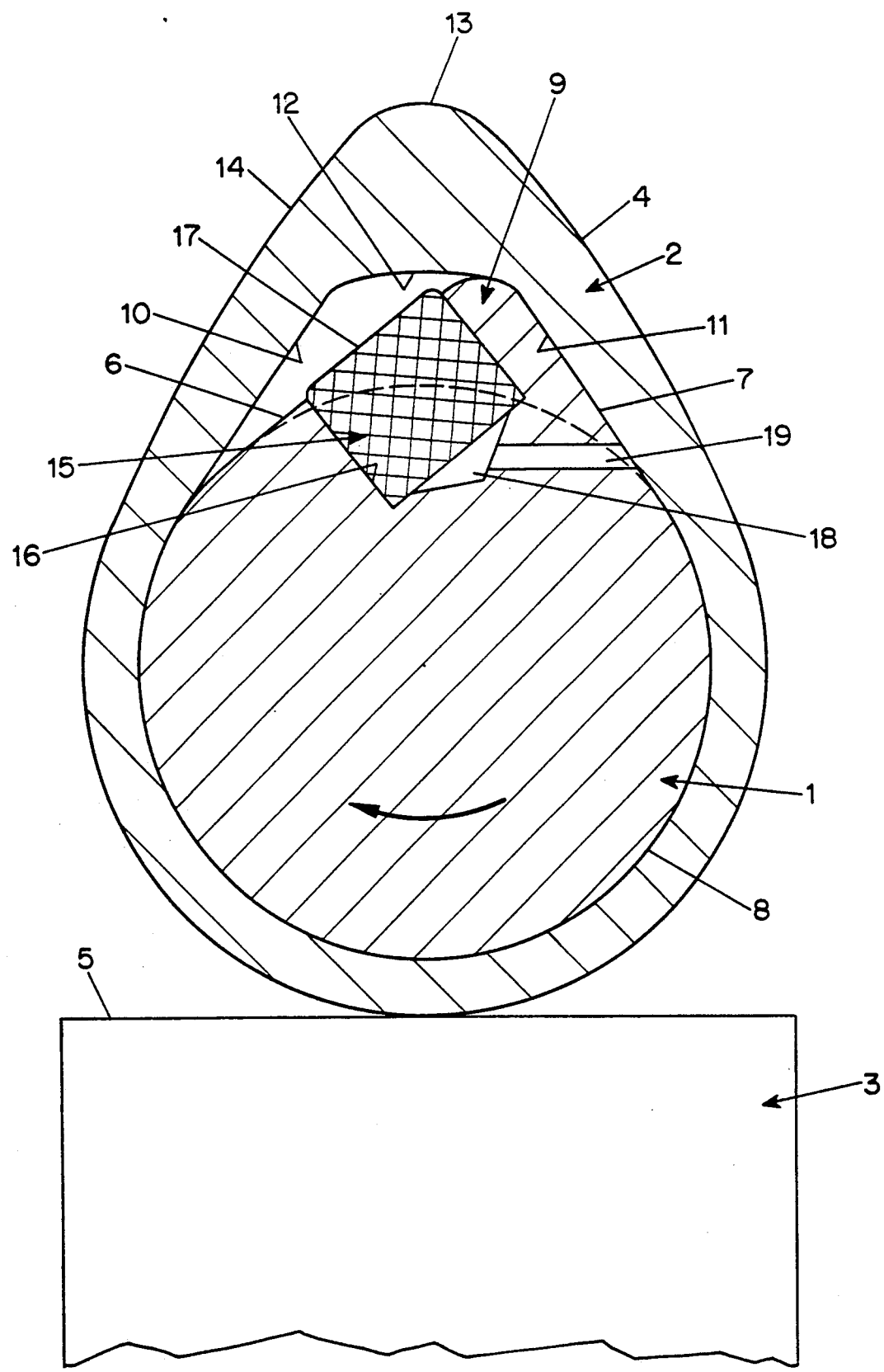
FIG. 1 is a cross-sectional view showing a representative embodiment of the invention utilizing a buffer comprising elastic material.

In the typical embodiment of the invention illustrated in FIG. 1, a variable am element 2 is driven by a camshaft 1 which rotates in the direction of the arrow. The arrangement serves to open a load-change valve by way of a cam follower 3 which is displaced downward as viewed in the drawing by the rotational action. The cam follower 3 is subject to the action of a closing spring (not illustrated) which provides a restoring force which closes the valve. As soon as the cam flank 4, which is the anterior flank with respect to the direction of rotation, comes into contact with the face 5 of the follower, the opening action of the valve begins. The cam element 2 is mounted for limited angular motion on the camshaft 1. The extent of this angular motion is limited by the fact that the faces 6 and 7 of a camshaft projection 9, which is elongated and extends radially beyond the base circle 8 of the camshaft 1, is opposed by two stops 10 and 11 within the cam element 2. These stops 10 and 11 bound an internal recess 12 in the cam element 2. This internal recess 12 permits relative angular motion of the cam element 2 and the camshaft 1 which is limited by the stops 10 and 11.

During the opening action of the valve, which continues up to the point in time at which the vertex 13 of the cam element 2 slides along the surface 5 of the cam follower 3, friction between the surface 5 and the cam periphery maintains the cam surface 11 in contact with the cam projection surface 7 as illustrated in FIG. 1. However, as soon as the cam flank 14, which is the posterior flank with respect to the direction of rotation, comes into contact with the surface 5 of the cam follower, the aforementioned valve-closing spring action exerts a force on the cam element 2 in the direction of the arrow so that the cam element 2 is rotated in that direction relative to the cam shaft 1. The resulting acceleration causes an impact between the surface 6 and the stop 10 that will generate unacceptable noise and wear in the absence of a cushioning arrangement.

The noise and wear are avoided in the embodiment of the invention shown in FIG. 1 by providing a buffer 15 of elastic material set into a recess 16 in the camshaft such that the anterior or outer surface 17 of the buffer projects beyond the camshaft face 6. With this arrangement, there are no sealing problems because no hydraulic pressure media are used. To enhance the malleability of the buffer 15, an open region 18 located behind the buffer in the recess 16 is in communication by way of a relief aperture 19 with the surface 7 located on the opposite side of the camshaft portion 9 so that, upon application of pressure to the buffer 15 form the left in FIG. 1, it can give way to the right into the region 18.

Figure 2:
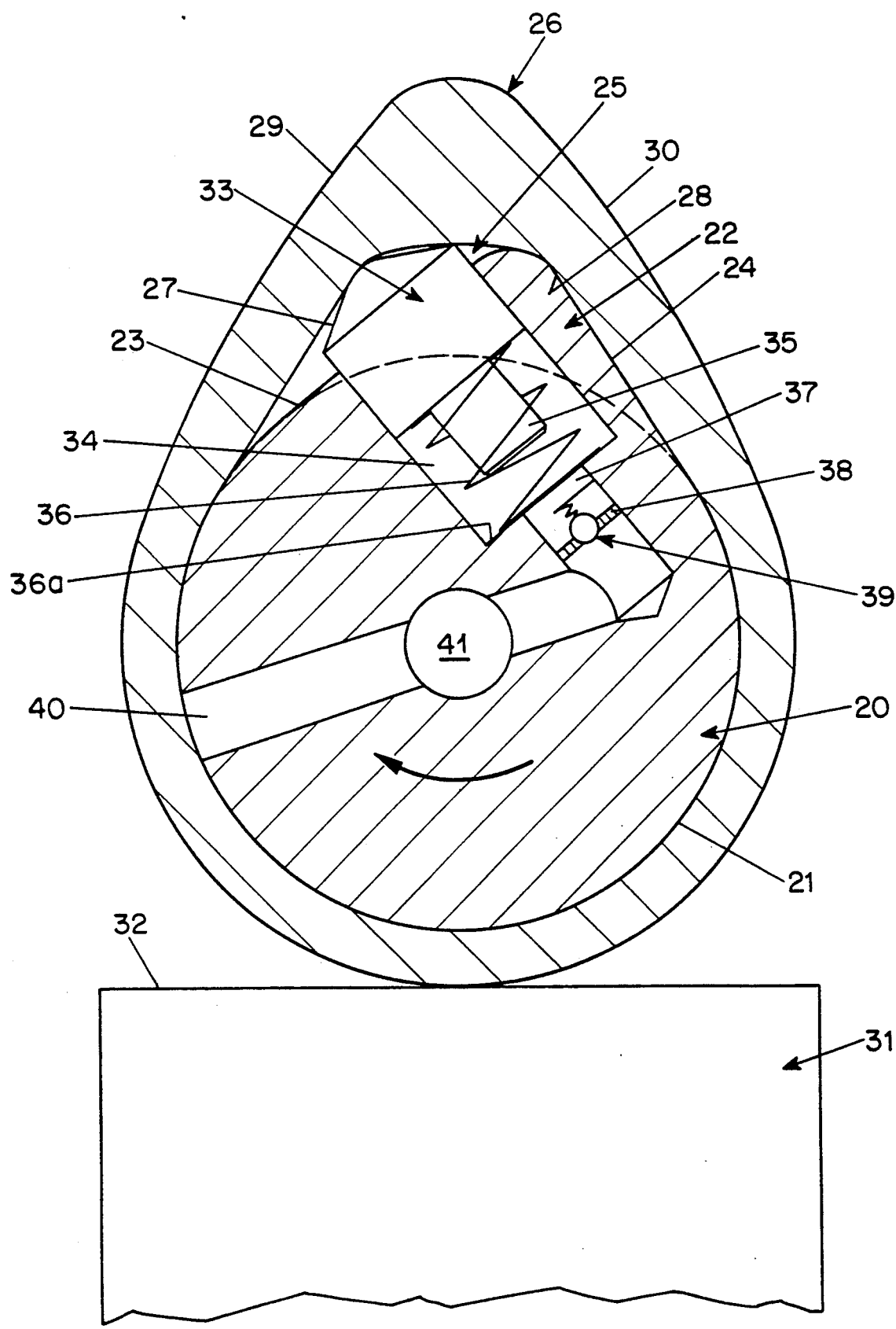
FIG. 2 is a cross-sectional view showing a further typical embodiment of the invention with a buffer comprising a piston and separate flow throttle.

Another embodiment of the invention is illustrated in FIG. 2. In this case, the relation of the cam, camshaft and cam follower is essentially the same as in that of FIG. 1. Thus, there is a camshaft 20 having a portion 22 projecting radially beyond an otherwise circular cross-section 21 which has lateral faces 23 and 24 and protrudes into a recess 25 of a cam element 26. The lateral internal surfaces of the cam bounding the recess 25 serve as two stops 27 and 28 which interface with the extended portion 22 of the camshaft in the same way as the aforementioned surfaces 23 and 24. The cam element 26 has flanks 29 and 30 which serve to produce an opening action of the valve via a cam follower 31. The closing action of the valve is again produced by the restoring force exerted by a conventional valve-closing spring. Also, as before, a relative angular motion of the cam element 26 and the camshaft 20 is produced by a combination of friction between the cam follower contact surface 32 and the cam element 26, and the force exerted by the closing spring of the valve.

In this second embodiment, a hydraulic damping means with a piston 33 that projects beyond the surface 23 acts as a buffer instead of the elastic buffer 15 shown in FIG. 1. The piston 33 is guided in a sealed oil-filled bore 34 and moves axially in the bore. The piston stem 35 serves to guide a compression spring 36 engaging the bottom 36a of the bore 34 which pushes the piston 33 outward toward the stop 27.

In this embodiment, the piston stem 35 is part of the cushioning arrangement. Just prior to contact between the cam element 26 and the camshaft 20, caused by the valve closing action, the stem 35 enters a hole 37 which has dimensions such that only a narrow annular gap remains as a flow area for hydraulic pressure medium. The reduction in flow area works as a flow throttle to cushion the impact of the cam element 26 with the camshaft 20. Even before the stem 35 enters the hole 37, there is some throttling action caused by a flow throttle 38 in the hole 37. This throttle 38 is arranged on a disk that forms the base of a check valve 39. The check valve 39 opens only in the direction to transfer hydraulic medium into the recess 34. The hole 37 works in combination with two additional openings or passages 40 and 41 (the latter in the axial direction of the camshaft) to form a supply passage connecting the camshaft with the hydraulic medium supply. For this purpose, the axial passage 41 may communicate with the oil supply of the engine.

In this embodiment, the hydraulic cushioning means operates exclusively within the camshaft 20. The hydraulic medium does not enter the interior recess 25 of the cam element, thus avoiding the hydraulic sealing problems which existed in the prior art.

Figure 3:
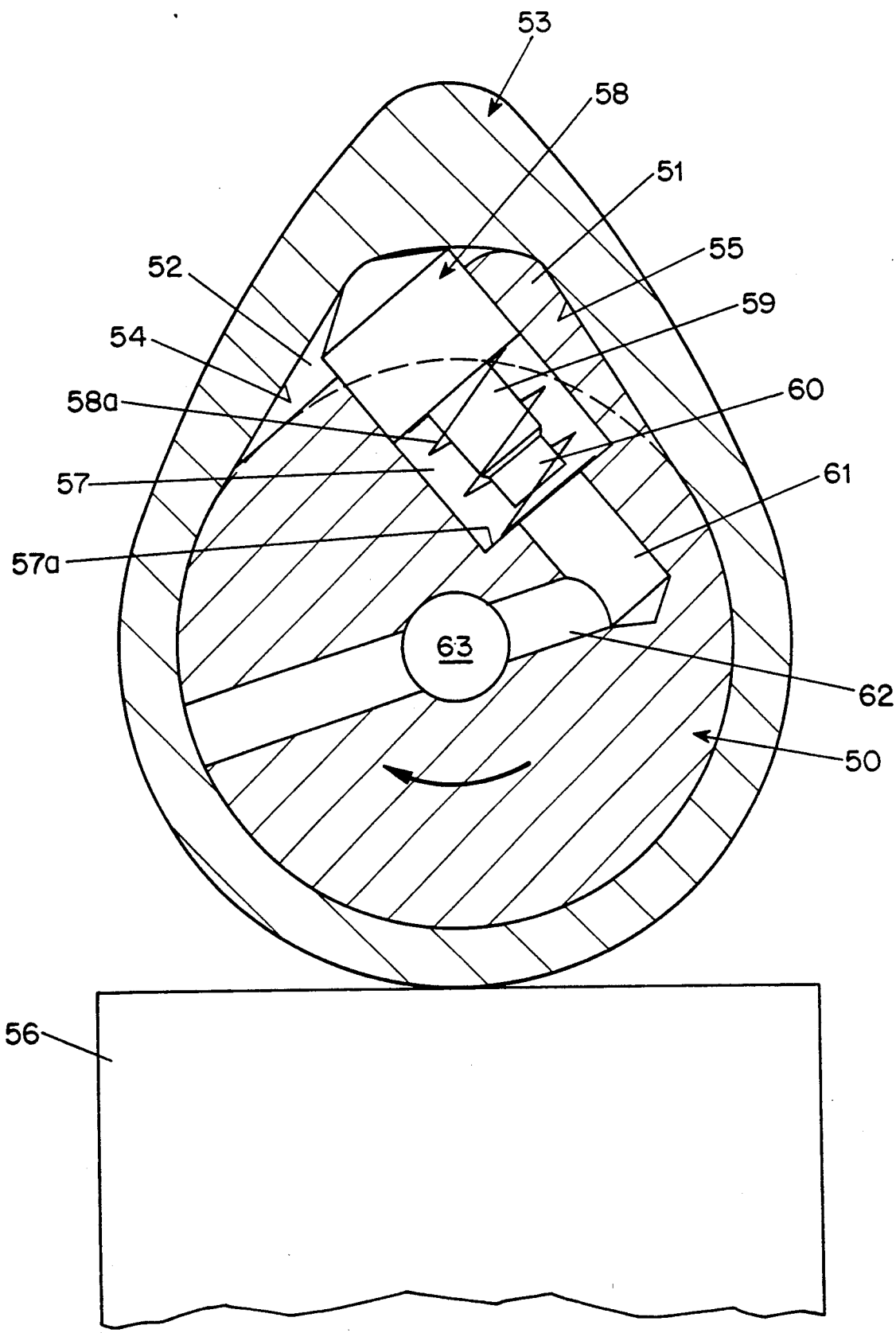
FIG. 3 is a cross-sectional view illustrating a third representative embodiment of the invention in which a buffer consists of a piston with an outer and inner stem portion.

A third embodiment of the invention, illustrated in FIG. 3, is similar to the second embodiment described above in that there is a hydraulic damping arrangement within a camshaft 50 having a portion 51 extending beyond what is otherwise a circular cross section. The portion 51 projects into an inner recess 52 of the cam element 53 and is capable of relative angular motion limited by two stops 54 and 55 within the cam element. Also, as in the aforementioned embodiment, the cam element 53 serves to open the valve by depressing a cam follower 56.

In this third embodiment, the cushioning arrangement comprises a piston 58 displaceable in the recess 57 of the camshaft 50, having a stem with two portions 59 and 60. The stem serves to guide a compression spring 58a which engages the bottom 57a of the recess 57. After a small displacement of the piston, the outer stem portion 60 enters a hole 61 constituting a flow throttle which is a component of the hydraulic pressure medium supply passage. This provides a means for reducing the flow cross-section in the supply passage. The supply passage also includes an opening 62 and a passage 63 corresponding to the passages 40 and 41 described in connection with the second embodiment. As the outer stem portion 60 enters the hole 61, the restriction of the resulting annular flow passage provides a first cushioning of the approach motions between the radially projecting portion 51 of the camshaft and the stop 54. When the piston 58 is more fully compressed, the larger inner piston stem portion 59 provides for a flow throttle with a still smaller annular flow gap. The creation of the smaller flow cross-section for the flow throttle increases the cushioning effect as the radially projecting portion 51 of the camshaft moves closer to the stop 54. In this embodiment, the check valve elements 38 and 39 shown in FIG. 2 are not required and, again, any seals are superfluous since the hydraulic medium is entirely contained within the camshaft.

The invention thus provides a camshaft arrangement that, by a simple and dependable structure, cushions the relative motion between a cam element and a camshaft. The arrangement thus avoids a hard impact between the cam element and the camshaft, limiting undesirable noise and wear without the need for an elaborate sealing means as in the prior art.

Although the invention has been described herein with reference to specific embodiments, many modifications and variations therein will readily occur to those skilled in the art. Accordingly, all such variations and modifications are included within the intended scope of the invention.

I claim:

1. A camshaft arrangement comprising:
   a camshaft having a cross-sectional configuration comprising a circular cross-section portion and a projection extending radially beyond the circular cross-section portion;
   at least one cam element supported on the camshaft for limited angular motion with respect thereto, the cam element having an internal recess accommodating the camshaft projection with an angular play defining the limited angular motion;

stop means limiting the relative angular motion between the cam element and ht camshaft upon contact between the camshaft projection and the cam element, the stop means comprising a side wall of the internal recess of the cam element; and cushioning means for cushioning contact between the camshaft projection and the side wall of the internal recess of the cam element;

the cushioning means comprising cushioning buffer means disposed within a recess in the camshaft projection which faces the side wall of the cam element recess, the cushioning buffer means extending beyond an outer surface of the projection for engaging the side wall of the internal recess of the cam element.

2. A camshaft arrangement according to claim 1 wherein the buffer means comprises an elastic material.

3. A camshaft arrangement according to claim 2 including a pressure relief passage extending between the buffer means and the opposite side of the camshaft projection.

4. A camshaft arrangement according to claim 1 wherein the buffer means comprises a piston extending within the recess in the camshaft projection, and wherein the projection recess communicates through a flow throttle with a hydraulic pressure medium supply passage within the camshaft.

5. A camshaft arrangement according to claim 4 wherein the flow throttle comprises a portion of the supply passage having a reduced flow cross-section with respect to the recess.

6. A camshaft arrangement according to claim 4 wherein the flow throttle comprises a throttle stem on a posterior side of the piston which enters the supply passage only shortly prior to contact between the wall of the internal recess in the cam element and the camshaft projection.

7. A camshaft arrangement according to any one of claim 4, 5, or 6 including check valve means which opens only in the direction leading from the hydraulic medium supply to the recess in the camshaft projection.

8. A camshaft arrangement according to claim 7 including a compression spring between the piston and a point of contact in the projection recess urging the piston toward the cam element inner wall.

9. A camshaft arrangement according to any one of claim 1, 4, 5 or 6 wherein the buffer means faces the cam element inner wall which is contacted by the projection when the cam element rotates at a higher angular velocity than the camshaft.

10. A camshaft arrangement according to claim 7 wherein the buffer means faces the cam element inner wall which is contacted by the projection when the cam element rotates at a higher angular velocity than the camshaft.

11. A camshaft arrangement comprising:

a camshaft having a cross-sectional configuration comprising a circular cross-section portion and a projection extending radially beyond the circular cross-section portion;

at least one cam element supported on the camshaft for limited angular motion with respect thereto, the cam element having an internal recess accommodating the camshaft projection with angular play defining the limited angular motion;

stop means limiting the relative angular motion between the cam element and the camshaft upon contact between the camshaft projection and the cam element, the stop means comprising a side wall of the internal recess of the cam element; and cushioning means for cushioning contact between the camshaft projection and the side wall of the internal recess of the cam element;

the cushioning means comprising cushioning buffer means disposed within a recess in the camshaft projection which faces the side wall of the cam element recess, the cushioning buffer means and extending beyond an outer surface of the projection for engaging the side wall of the internal recess of the cam element;

wherein the buffer means comprises a piston extending within the recess in the camshaft projection, and wherein the projection recess communicates through a flow throttle with a hydraulic pressure medium supply passage within the camshaft, including a compression spring between the piston and an end of the recess in the projection recess urging the piston toward the cam element inner wall.

12. A camshaft arrangement according to claim 11 wherein the buffer means faces the cam element inner wall which is contacted by the projection when the cam element rotates at a higher angular velocity than the camshaft.

13. A camshaft arrangement according to claim 8 wherein the buffer means faces the cam element inner wall which is contacted by the projection when the cam element rotates at a higher angular velocity that the camshaft.

14. A camshaft arrangement according to claim 11, wherein the flow throttle comprises a portion of the supply passage having a reduced flow cross-section with respect to the recess.

15. A camshaft arrangement according to claim 11, wherein the flow throttle comprises a throttle stem on a posterior side of the piston which enters the supply passage only shortly prior to contact between the wall of the internal recess in the cam element and the camshaft projection.

* * * * *